Jan. 4, 1938.  C. L. DALY  2,104,583
RUBBER SOLE
Filed Aug. 23, 1934
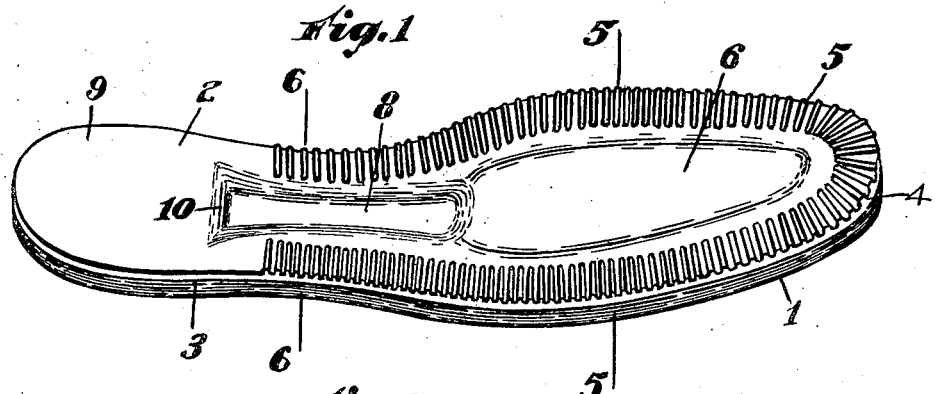
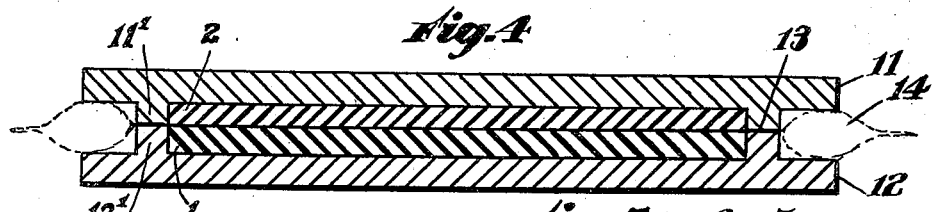
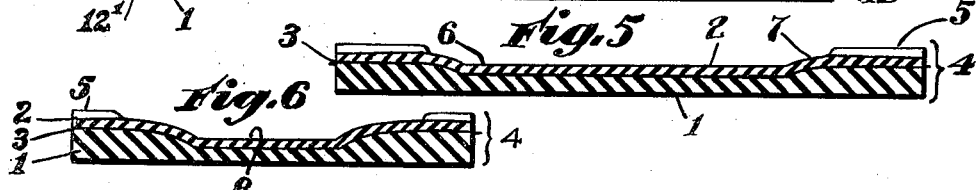
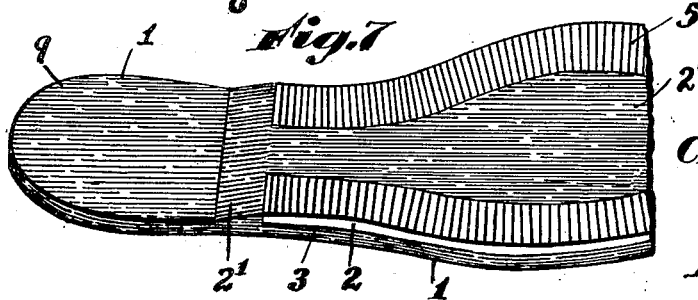
Inventor
Charles Leo Daly
Ellis Spear Jr.
By Attorney Patented Jan. 4, 1938

2,104,583

UNITED STATES PATENT OFFICE 2,104,583

RUBBER SOLE

Charles Leo Daly, Belmont, Mass., assignor to Daly Bros. Shoe Company, Inc., Boston, Mass., a corporation of Massachusetts Application August 23, 1934, Serial No. 741,101

2 Claims. (Cl. 36—32)

This invention relates to the manufacture of molded rubber shoe parts, as for example, outer soles, heels, etc.

For the purposes of this application the discussion herein has been restricted to outer soles, although the principles of the invention also apply to heels and other shoe parts.

Considering the outer sole as typical of the problems involved, it may be pointed out that in the manufacture of shoes having molded rubber outer soles, it is sometimes desirable to use a composite rubber sole consisting of at least two layers which differ in their characteristics.

Such differences may be a difference in color characteristic, or in physical characteristic, or in both. Typically, the layers may differ in their color characteristic. For example, one layer, usually the outer, may be the characteristic black color of rubber, in which event the other or inner layer will be of some contrasting color, as tan.

Heretofore in the molding of such composite rubber outer soles it has been impossible to obtain a clean, neat, sharp line of demarcation between the two layers of the composite rubber sole when vulcanized. Instead, the layers have tended to consolidate with each other along uneven, wavy or irregular lines. This detracts from the appearance of the sole and of the shoe to which the sole is attached.

The uneven, irregular and unsightly line of juncture between the two layers results from the method of molding the composite sole now generally followed. According to such method the two biscuits of differently colored rubber are superposed upon one another in the bottom member of the mold, the top mold member is placed thereover, and the sole vulcanized. During the vulcanization process, the two biscuits flow into one another. This produces an uneven and irregular line of juncture between the two layers of the vulcanized sole which greatly detracts from the appearance of the finished product.

In order to conceal this unsightly line, the usual practice is to paint over part of the lighter colored layer to match the darker colored layer and give the effect of a clean, sharp line of demarcation between the two differently colored layers. This is not only an "after" operation involving extra time, labor and expense, but requires some little skill as well.

The present invention contemplates a method and product which will avoid the defects and disadvantages of the prior practice to the end that the composite rubber sole when vulcanized will have a clean, straight regular line of demarcation between the individual layers, thus materially enhancing the appearance of the shoe to which such sole is attached.

In carrying out the invention the recess of one mold member is filled with a biscuit or layer of vulcanizable rubber of one characteristic, and the recess of the coacting mold member with a layer or biscuit of vulcanizable rubber of different characteristic color. These individual layers may be of any desired thickness and of any desired color or instead of distinguishing from each other in point of color characteristic they may distinguish from each other in point of physical characteristic.

However distinguished, the next step in the practice of the method of molding is to bring the two mold members together in molding relation and vulcanize the two layers together in face to face contact with each other as an integral article.

With this method, there is no tendency during vulcanization for one layer to flow into the other. Instead, provision is made for one of the layers to overflow around the margin of the coacting mold members. Such marginal overflow is subsequently trimmed off, leaving as the physical line of demarcation between the consolidated layers a marginal fin or feather edge of extreme thinness constituted by the marginal overflow itself. This fin or feather edge exists as a clean, sharp, definite line of demarcation at the juncture of the two layers. The edge therefore is an attractive edge and one wherein there is no necessity for subsequently painting or staining one of the layers in the effort to obtain a neat, clean edge as has heretofore been necessary in the art.

The method of the present invention may be practiced in the molding of rubber soles of any desired length, as full length soles, three-quarter soles, or half soles. As a part of the process one of the coacting mold members may be so designed as to impart to the inner layer during the molding operation the conventional decorative marginal wheel marks which in many types of soles are not applied until after the manufacture of the sole is completed. The advantage of providing the sole with such marginal wheel marks is, of course, that the wheel marks are molded directly into the inner layer as a part of the molding operation instead of by means of a separate "after" operation.

Various pattern effects of the contrastingly colored layers may be had. For example, the inner layer may be of a solid color throughout, as tan, and the outer layer of a contrasting color, as black. Or the contrasting color of the outer layer may be carried into and through the inner layer, as by extending it forwardly from the heel towards the toe between the margins of the sole so as to accentuate the contrast of the colors.

Similarly the composite sole may be either of the same thickness throughout or may be of different thicknesses in different areas thereof. For example, it may be thick at its margins and depressed in certain areas between its margins to afford a countersunk area in the region of the ball of the foot, or the shank, or both.

These and various other functional and constructional features of advantage are all secured in the method and article of the present invention.

For the purposes of this application two embodiments of the present invention have been shown, together with suitable apparatus for the practice of the present method. In the drawing the showing of the mold sections has purposely been made somewhat diagrammatic for the sake of clearness.

Fig. 1 is a perspective view of a composite molded rubber outer sole in accordance with the teachings of the present invention, as seen from the top or inner face thereof.

Figs. 2 and 3 are diagrammatic cross sectional views of the respective mold members within which the individual rubber biscuits of different characteristics are individually assembled for vulcanization when the mold members are brought together as in Fig. 4.

Fig. 4 is a cross section showing the individual mold members brought together in vulcanizing relation and the individual biscuits vulcanized together as an integral article, the resultant overflow being indicated in the condition in which it exists before it is trimmed off to provide the ultimate sole illustrated in Fig. 1.

Figs. 5 and 6 are cross sectional views on the lines 5—5 and 6—6, respectively, of Fig. 1, and Fig. 7 is a fragmentary perspective showing a modified design of sole in accordance with the present invention, as seen from the top of inner face thereof.

The composite rubber outer sole of the present invention consists of an outer layer 1 and an inner layer 2 vulcanized together to form an integral article which presents either entirely around its margin or around so much thereof as desired, a clean, straight well defined line or edge of demarcation 3 at the juncture of the consolidated layers 1 and 2.

The material of the layers 1 and 2 is vulcanizable rubber. The individual layers may be rubber of the same physical characteristics, but contrastingly colored, or the materials of the respective layers may be of different physical characteristics.

For the purposes of this application the inner layer 2 may be considered to be rubber containing as an ingredient a coloring pigment which will impart a light or tan colored appearance thereto in contrast to the normal dark or black appearance of the outer layer 1. Obviously, of course, other contrasting color combinations may be employed and, of course, the laminated sole may consist of more than two layers, if desired.

Preferably, although not necessarily, the thickness of the composite rubber sole may vary in different areas thereof. As here shown the composite sole is thicker around its marginal edge than elsewhere. This region of increased thickness extends around the forepart and back towards the heel area of the sole and is indicated generally by the reference character 4. As best appears in Figs. 5 and 6, such region of increased thickness extends inwardly from the margin of the sole a substantial distance.

Also preferably, but not necessarily, this region of increased thickness 4 may be provided with a series of wheel marks indicated generally at 5. These are molded into the layer 2 during the molding operation and take the form of alternate ridges and depressions simulating in general appearance the appearance of the mechanically formed wheel marks in a leather outer sole.

The fore-part of the sole included between said wheel marks, or a portion at least, thereof is or may be depressed as indicated at 6 with reference to the raised or thickened area which bears said wheel marks, the depressed area 6 merging with the thickened area 4 by an upwardly inclined surface 7 (see Fig. 5).

Also preferably, but not necessarily, some part of the included area 6 may be even more deeply depressed than the fore-part area 6 as indicated at 8 to provide a pocket or recess for the reception of a shank stiffener, not shown. Such area 8 may and preferably does extend rearwardly beyond the terminals of the wheel marks 5 and may merge with the heel seat area 9 of the composite outer sole as by an upwardly inclined bevel 10.

Although the construction just described is preferable in some instances, it is not essential and the composite sole may be of uniform thickness throughout all areas or at least of uniform thickness from the tip to the heel seat area of the composite sole, (see Fig. 7) the heel seat area being constituted entirely by the bottom or outer layer 1, the top or inner layer 2 joining the same in the region of the heel breast of the shoe and being downwardly beveled as at $2^1$ in Fig. 7 to merge therewith.

In some instances also an attractive color scheme or pattern may be provided by having the area of the top or inner layer 2 included by the wheel marks so molded that the underlying outer layer 1 extends forwardly therebetween and is exposed on the inner face of the sole as at $2^a$ in contrast to such inner layer. This is simply a matter of die design and various patterns and color schemes will readily suggest themselves to those skilled in the art.

Describing now the molding method by which the present invention produces the clean, straight, sharp line or edge 3 of demarcation between the respective layers and as will be noted in Figs. 2, 3 and 4, a pair of complemental mold members 11 and 12 are provided each having an inset marginal flange $11^1$ and $12^1$ extending continuously around the mold sections, if the two tone color scheme is carried out throughout the entire area of the composite sole (see Fig. 1), but terminating at approximately the heel breast of the shoe if the two tone color scheme is to extend only that far back (see Fig. 7). The respective flanges $11^1$ and $12^1$ define recesses for the reception of batches or biscuits of rubber which are to be vulcanized together to form the integral laminated sole disclosed. Each pocket or recess of each mold member is of a depth sufficient to form an ultimate layer of the desired thickness in the final product.

As shown, the respective layers 1 and 2 are of different thicknesses, the top or inner layer 2 being thinner than the bottom or outer layer 1. This, however, is a matter of choice and the arrangement as to thickness may be reversed if desired, or the layers may be of the same thickness.

In practice, each pocket or recess of each mold member is filled with a batch or biscuit of vulcanizable rubber of the desired physical or color characteristic. For the purposes of this application the light or tan colored inner layer 2 may be considered as having been placed within the recess of the mold member 11 and the dark or black outer layer 1 as having been placed within the pocket or recess of the cooperating mold member 12.

The filled mold members 11 and 12 are then brought together in the relation illustrated in Fig. 4 and subjected to the heat of vulcanization. The individual batches or biscuits 1 and 2 overflow marginally about the confines of the mold at the region marked 13 in Fig. 4 which is the region at which the flanges 11¹ and 12¹ abut each other when the molds are reversed and brought together in the relation of Fig. 4. Such capacity for overflow prevents one batch from flowing into or commingling with the other batch, the overflowing material at the margin of the mold members overflowing as at 14 and subsequently being trimmed off.

When the mold members are separated and the vulcanized composite outer sole removed therefrom, it will be found that the only perceptible line of demarcation between the consolidated layers 1 and 2 is a marginal fin or feather edge heretofore designated as 3 in this description. Such fin or feather edge is extremely thin and constitutes a distinct line of cleavage or demarcation between the two layers. Although originally as long as the width of the flanges 11¹ and 12¹ it may in practice be trimmed back to the edge of the composite sole when the overflow 14 is trimmed off. The fin itself is constituted by whichever of the two batches overflowed when the mold members were brought into the relation of Fig. 4 and the heat of vulcanization applied and is usually constituted by the upper or inner layer 2.

While the present invention has been shown and described in its adaptation to the molding of a composite outer sole, this treatment is purely illustrative and in no way limiting. Obviously other shoe parts, as rubber heels, may be similarly molded.

Various other modifications in method, product and use may be resorted to within the spirit and scope of this invention as defined by the appended claims.

What is therefore claimed and desired to be secured by Letters Patent is:—

1. A laminated molded rubber shoe sole, consisting of at least two layers of different colored vulcanizable rubber so vulcanized together as to present at their zone of juncture a sharp, regular, well-defined line of demarcation, the top layer terminating in the region of the breast line of the shoe and forwardly of such terminal being recessed interiorly of its marginal edges, and the bottom layer extending within such recess and being exposed on the upper face of the sole in contrast to the top layer.

2. A laminated molded rubber sole, consisting of at least two layers of vulcanizable material of different characteristic vulcanized together to present at their zone of juncture a sharp, regular, well defined line of demarcation, a portion of the marginal area of the sole being of greater thickness than the area included by said marginal area, the included area being of different thickness in different areas thereof, and one of the thinner regions of said included area constituting a pocket for a stiffener element.

CHARLES L. DALY.